United States Patent Office 3,432,493
Patented Mar. 11, 1969

3,432,493
SUBSTITUTED SULFANILAMIDES
James Harold Short, Lake Forest, Ill., assignor to Abbott Laboratories, North Chicago, Ill., a corporation of Illinois
No Drawing. Filed June 27, 1966, Ser. No. 560,799
U.S. Cl. 260—239.75      5 Claims
Int. Cl. C07d 51/44; A61k 27/00

ABSTRACT OF THE DISCLOSURE

This invention relates to sulfanilamide compounds having the general formula

wherein R represents 2-amino-6-loweralkyl-4-pyrimidinyl, 4-amino-6-hydroxy-2-pyrmidinyl, 6-amino-4-pyrimidinyl, 2-amino - 6 - (p-sulfamylanilino)-4-pyrimidinyl, 2-anilino-6-loweralkyl - 4 - pyrimidinyl, 2,6-diloweralkoxy-4-pyrimidinyl, and 2-amino-4-S-triazinyl and their acid addition salts. These sulfanilamides are useful in increasing the flow of blood in coronary vessels of a warm-blooded animal.

---

This invention is directed to a novel series of chemical compounds, and more particularly, to a series of substituted benzenesulfonamides having the general formula

and their acid-addition salts.

In the above formula, R represents 2-amino-6-loweralkyl-4-pyrimidinyl, 4 - amino-6-hydroxy-2-pyrimidinyl, 6-amino-4-pyrimidinyl, 2-amino - 6 - (p-sulfamylanilino)-4-pyrimidinyl, 2-anilino - 6 - loweralkyl-4-pyrimidinyl, 2,6-diloweralkoxy - 4 - pyrimidinyl and 2-amino-4-S-triazinyl. The terms loweralkyl and loweralkoxy refer to moieties having 1 to 4 carbon atoms.

The non-toxic compounds of this invention exhibit valuable pharmacological therapeutic effects. It has been found that these compounds are potent dilators of coronary vessels and are therefore useful in the treatment of angina pectoris. For example, when the free bases or their non-toxic acid-addition salts of this invention are dissolved in saline or suspended in a 50% aqueous propylene glycol solution, and administered intravenously to warm-blooded animals in a dosage of from 10 to 150 mg./kg. of body weight, there is a marked increase in the flow of coronary blood. Coronary blood flow may be increased by as much as 25% within the first hour, and by even greater percentages within the next few hours after administration. Other acid-addition salts of this series are useful as intermediates in making the non-toxic salts or the free bases, which have the aforementioned utility.

In general, the novel compounds of this invention are prepared by reacting the appropriately substituted chloropyrimidine with an equimolar proportion of sulfanilamide. The reactants are dissolved in a suitable solvent, such as water or alcohol, or a combination of such solvents, and refluxed with heating for 1 to 24 hours. Generally, the reaction is completed within 1 to 2 hours, but refluxing may be continued to obtain maximum yields. The temperature may be maintained at from room temperature to reflux temperature, depending upon the reaction rate desired. The hot solution is cooled thereby precipitating the product which is then recrystallized from an appropriate hydroxylic solvent, such as water or alcohol, and dried. In this manner, the free base may be formed.

However, since the free base is insoluble in water, it may be desired to have the reaction proceed directly to the acid-addition salt by adding small amounts of concentrated acid to the reaction mixture. The acid-addition salt may be converted to the free base by dissolving the salt in an acid or neutral solution and raising the pH to an alkaline level until the free base precipitates from the solution.

In the examples following herein, the reactions described generally relate to the preparation of the acid-addition salts, and more specifically, to the hydrochloride salts. However, it is to be understood that the free bases are prepared according to the same general reaction scheme, as is understood by those skilled in the art. The following examples serve to illustrate various specific embodiments of this invention and are in no way designed to limit the invention.

Example 1.—N⁴-(2-amino-6-methyl-4-pyrimidinyl)-sulfanilamide hydrochloride

A solution of 0.05 mole of sulfanilamide and 0.05 mole of 2-amino-4-chloro-6-methylpyrimidine in 100 ml. of water, in which 3 ml. of concentrated hydrochloric acid is added, is stirred while heating on a steam bath for 2 hours. A precipitate is then formed and the hot solution is filtered. The filtrate is then chilled and the precipitate is collected on a filter, washed with cold water and dried. The precipitate is recrystallized from boiling water and dried, yielding N⁴-(2-amino-6-methyl-4-pyrimidinyl)- sulfanilamide hydrochloride, having a melting point of 329°–330.5° C.
*Analysis.*—Calculated: C, 41.85%; H, 4.46%; N, 22.18%. Found: C, 41.77%; H, 4.84%; N, 22.33%.

Example 2.—N⁴-(6-amino-4-pyrimidinyl)-sulfanilamide hydrochloride

To 300 ml. of water containing 7.8 ml. of concentrated hydrochloric acid is added 16.8 grams of 4-amino-6-chloropyrimidine and 22.4 grams of sulfanilamide. The mixture is refluxed for 2 hours. The hot solution is treated with activated charcoal, such as that sold under the trademark "Darco," and a precipitate forms. The cream-colored precipitate is filtered, chilled and filtered again. Recrystallization from water yields 19 grams of N⁴-(6-amino-4-pyrimidinyl)-sulfanilamide hydrochloride having a melting point of 293°–295° C.

Example 3.—N⁴-(2-anilino-6-methyl-4-pyrimidinyl)-sulfanilamide hydrochloride

To a solution of 50 ml. of water, 100 ml. of ethanol and 3 ml. of concentrated hydrochloric acid is added, 8.6 grams (0.05 mole) sulfanilamide and 11.0 grams (0.05 mole) of 2-anilino-4-chloro-6-methyl pyrimidine. The mixture is refluxed with stirring for one hour. Upon cooling, a precipitate forms which is then filtered out. The precipitate is washed twice wih 100 ml. of acetone and dried. Recrystallization from methanol-ether yields 14.8 grams of N⁴-(2-anilino-6-methyl-4-pyrimidinyl) - sulfanilamide hydrochloride having a melting point of 284°–286° C.

Example 4.—2-(4-amino-6-hydroxy-2-pyrimidinyl)-sulfanilamide

To 100 ml. of ethanol is added 0.05 mole of 2-chloro-4-amino-6-hydroxy pyrimidine and 0.05 mole of sulfanilamide and the mixture is refluxed for 2 hours. Upon cooling, a precipitate forms which is then filtered from the solution. The residue is recrystallized with one mole of water from boiling water and dried, yielding 2-(4-amino-6-hydroxy-2-pyrimidinyl)-sulfanilamide having a melting point of 203°–206.5° C.
*Analysis.*—Calculated: C, 40.12%; H, 4.38%; N, 23.40%. Found: C, 40.21%; H, 4.77%; N, 23.49%.

Example 5.—N⁴-(2,6-dimethoxy-4-pyrimidinyl)-sulfanilamide hydrochloride

To a solution of 50 ml. of water, 50 ml. of ethanol and 3 ml. of concentraed hydrochloric acid is added 8.6 grams (0.05 mole) of sulfanilamide and 8.73 grams (0.05 mole) of 2,6-dimethoxy-4-chloropyrimidine. The mixture is refluxed with stirring for 2 hours, then cooled to room temperature and concentrated at reduced pressure to about 20 ml. forming a precipitate. About 200 ml. of acetone is added and the mixture is shaken vigorously and filtered. The while solid obtained is washed with 50 ml. of acetone and dried. The solid is twice recrystallized from aqueous methanol yielding N⁴-(2,6-dimethoxy-4-pyrimidinyl)-sulfanilamide hydrochloride having a melting point of 189°–190° C.

*Analysis.*—Calculated: C, 46.44%; H, 4.55%; N, 18.06%. Found: C, 46.29%; H, 4.52%; N, 18.08%.

Example 6.—N⁴-[2-amino-6-(p-sulfamylanilino)-4-pyrimidinyl]-sulfanilamide hydrochloride To a solution of 100 ml. of water, 40 ml. of ethanol and 3 ml. of concentrated hydrochloric acid is added 8.2 grams (0.05 mole) of 2-amino-4,6-dichloro-pyrimidine and 8.6 grams (0.05 mole) of sulfanilamide. The mixture is refluxed with stirring for one hour and then the solution is cooled. Upon cooling, a pale yellow precipitate is obtained which is filtered out of solution and twice washed with 50 ml. of acetone and dried. The solid mass is twice recrystallized from aqueous methanol, yielding N⁴-[2-amino-6-(p-sulfamylanilino)-4-pyrimidinyl]-sulfanilamide hydrochloride having a melting point of 266°–267° C.

*Analysis.*—Calculated: C, 40.71%; H, 3.84%; N, 20.78%; O, 13.56%. Found: C, 40.53%; H, 4.12%; N, 20.74%; O, 13.64%.

Example 7.—N-(4-amino-s-triazin-2-yl)-sulfanilamide

A mixture of 41.8 grams (0.2 mole) of sulfanilamide hydrochloride and 16.8 grams (0.2 mole) of dicyandiamide is refluxed with 70 ml. of pyridine for 3 hours. Upon cooling the solution, a dense crystalline precipitate forms. This is recrystallized from pyrimidine, filtered, washed with acetone and dried. The precipitate is 1-(p-sulfamylphenyl)-biguanide hydrochloride. A solution of 2.14 grams (0.093 mole) of sodium in 80 ml. of methanol is prepared and 27.2 grams (0.093 mole) of sulfanilamido biguanide hydrochloride is added followed by 6.9 grams (0.093 mole) of ethyl formate. The reaction mixture is maintained at room temperature for 18 hours and then 50 ml. of water is added. A precipitate forms which is filtered, washed with 25 ml. of methanol and dried. The yield is 7.5 grams of N-(4-amino-s-triazin-2-yl)-sulfanilamide having a melting point of 280°–282° C.

*Analysis.*—Calculated: C, 40.6%; H, 3.8%; N, 31.6%. Found: C, 40.8%; H, 3.8%; N, 31.6%.

I claim:
1. A compound selected from the group consisting of a compound of the formula

wherein R is a member selected from the group consisting of 4-amino - 6 - hydroxy-2-pyrimidinyl, 2-amino-6-(p-sulfamyl-anilino) - 4 - pyrimidyl, 2-anilino-6-loweralkyl-4-pyrimidinyl, and 2,6-diloweralkoxy-4-pyrimidinyl, and the pharmaceutically-acceptable acid-addition salts thereof.

2. A compound according to claim 1 wherein R is 4-amino-6-hydroxy-2-pyrimidinyl.

3. A compound according to claim 1 wherein R is 2-amino-6-(p-sulfamylanilino)-4-pyrimidinyl.

4. A compound according to claim 1 wherein R is 2-anilino-6-methyl-4-pyrimidinyl.

5. A compound according to claim 1 wherein R is 2,6-dimethoxy-4-pyrimidinyl.

References Cited

UNITED STATES PATENTS 2,829,143   4/1958   Cutler et al. _____ 260—239.65
3,159,547   12/1964  Schoepke et al. _____ 167—51.5

OTHER REFERENCES

Maggiolo et al.; Chemical Abstracts 46:2551.

HENRY R. JILES, *Primary Examiner.*

C. M. SHURKO, *Assistant Examiner.*

U.S. Cl. X.R.

260—239.7, 249.5, 251, 256.4; 424—229